Jan. 21, 1958 H. L. HORWITZ ET AL 2,820,848
TWO-PARTY LINE INDIVIDUAL METERING
Filed March 12, 1953
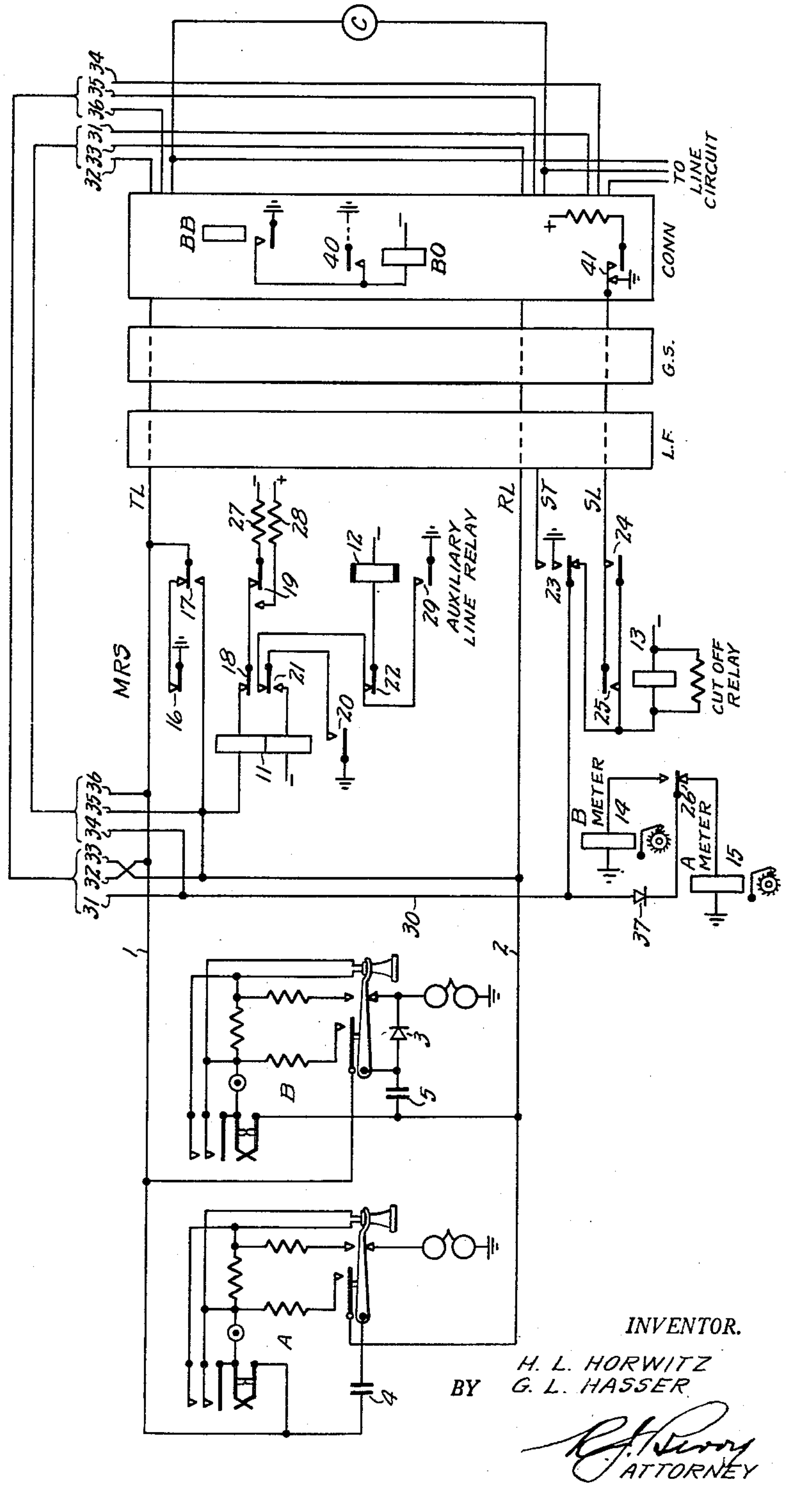
INVENTOR.
H. L. HORWITZ
BY G. L. HASSER
ATTORNEY United States Patent Office 2,820,848

Patented Jan. 21, 1958

2,820,848

TWO-PARTY LINE INDIVIDUAL METERING

Henry Leopold Horwitz, Nutley, and George Louis Hasser, Packanack Lake, N. J., assignors to International Telephone and Telegraph Corporation, a corporation of Maryland Application March 12, 1953, Serial No. 341,857

3 Claims. (Cl. 179—8.5)

This invention relates in general to telephone systems but more particularly to automatic telephone systems which are arranged to provide party line service.

It is an object of our invention to provide improved circuits which are simple and economical and which function in a positive and reliable manner to select the calling subscriber's meter. Numerous forms of party line systems have been proposed heretofore in which the calling subscriber's meter is selected but usually these prior systems have required complicated devices at the sub-stations or in the central office.

One object of our invention resides in the provision of a rectifier, which may be of the selenium type, in one of the sub-station circuits of a party line and of simple means at the central office to determine the identity of the calling party on the line.

According to one feature of our invention there is provided at one of the stations on a party line a normally open connection, including a rectifier, extending from one of the line conductors to ground, such connection being closed responsive to the initiation of a call by a subscriber at the station, and at the exchange testing means for determining the presence or absence of such grounded connection at a calling station and means controlled by the testing means for connecting in the metering circuit the meter individual to the calling station on the party line.

Other objects, purposes and characteristic features of the present invention will be apparent from the following description read in conjunction with the accompanying drawing.

Referring now to the drawing, there is shown by means of the usual circuit diagrams sufficient of the apparatus in an automatic telephone system to enable the invention to be readily understood.

The drawing illustrates two subscriber's stations A and B on a two-party line, the two line conductors 1 and 2 of which terminate in a line circuit at the central office and in the terminal banks of the connectors. The switching train comprising a line finder LF, a group selector GS and a connector CONN may be of the two-motion type well known to the art in step-by-step telephone exchange switching systems.

An idle line finder such as LF is caused to hunt for the calling line when ground is applied to a start wire ST. The finder will hunt vertically for a particular level and horizontally for a marked terminal indicative of the calling line in that level. The line finder LF extends the calling line to a group selector GS, the wipers of which are stepped up to the desired level under the control of the calling subscriber's dial or impulse sender and are then automatically rotated to engage an idle connector switch CONN which in turn is controlled by the last two digits of a called subscriber's number transmitted by the calling subscriber's dial. The wipers of the connector switch CONN are raised to the desired level and then rotated to a set of bank contacts to which the called subscriber's station line is connected. The called station line C is shown in the drawing to the right of the connector CONN.

It will first be assumed that the subscriber at station A on the party line desires to call the subscriber at station C. When the subscriber at station A lifts his hand set from the cradle a loop is closed in the usual manner at the switch hook contacts over the sub-station line and a circuit is closed for the upper winding of line relay 11 in the line circuit MRS. This circuit may be traced from negative battery over the 100 ohm resistor 27, contacts 19 of relay 12, contacts 18 of cut-off relay 13, upper winding of relay 11, lower talking conductor 2, the switchhook contacts at station A, telephone transmitter, normally closed dial springs, the upper talking conductor 1, contacts 17 of relay 12 and contacts 16 of cut-off relay 13. Relay 11 operates and at its contacts 20 closes a circuit over contacts 21 and 22 of cut-off relay 13 for a slow release auxiliary line relay 12.

Relay 12 upon operating locks over contacts 22 and 29, opens at contacts 17 the previously-described circuit of relay 11 and connects one side of the upper winding of the last-mentioned relay to the upper talking conductor 1 in parallel with the lower talking conductor 2, at make-before-break contacts 19 connects the other side of upper winding of relay 11 to positive battery, at contacts 24 connects the winding of cut-off relay 13 to the test lead SL of the line finder circuit, and at contacts 23 connects ground to the test wire 30 extending to the test terminals in the banks of the connectors and grounds the common start wire ST to start a line finder hunting for the calling line in known manner. The resistor 28 protects the exchange battery against heavy current strain upon the operation of the make-before-break contacts 19.

Relay 11 releases when the station loop circuit is opened by the operation of relay 12 and it cannot reoperate via the positive battery over contacts 19, due to the absence of a circuit via the sub-station.

Cut-off relay 13 is energized over a ground from the line finder LF when the latter engages the contact to which is connected the test lead SL from the line circuit MRS. Cut-off relay 13 locks up to the grounded test lead SL over its contacts 25, opens the circuit of relay 12 at contacts 22, at contacts 18 opens the circuit to the upper winding of relay 11, at contact 16 removes the ground applied via back contacts 17 to the upper talking conductor 1 and at contacts 21 provides a locking circuit for the line relay 11 over its lower winding, to permit this relay to lock up if it is operated at this time in a manner which will be described in connection with a call from the other station B on the party line. In the present call from station A, however, the line relay 11 is not reoperated at this time since there is no circuit for its upper winding via the calling station circuit.

The upper and lower talking conductors 1 and 2 are now free of attachments and are extended over conductors TL and RL to the talking wipers of the line finder LF. The cut-off relay 13 is locked up over the test lead SL and upon the release of relay 12 by the opening of contacts 22, the meter 15 of the sub-station A at which the call originated is connected over break contacts 26 and rectifier 37 in parallel with the locking circuit of the cut-off relay 13 to the test wire SL. The calling line is maintained busy in the connector banks after the release of the relay 12 by a ground returned over the test lead SL from the line finder LF in normal manner. The release of relay 12 also removes ground from the line finder start wire ST.

The connection is now extended over the succeeding switches GS and CONN to the wanted subscriber line C, in known manner, by operation of the impulse dial at the calling station.

When the called party answers by lifting his receiver, the back bridge relay BB in the connector CONN operates in the usual manner and completes an obvious circuit for the booster relay BO which locks up over its contacts 40, and at contacts 41 applies positive booster battery to the test wire SL thereby causing the operation of the service meter 15 over a circuit which may be traced over contacts 25, 23, rectifier 37, and contacts 26. The cut-off relay 13 is held operated over the test wire SL.

When the call is terminated and the calling and called parties hang up, ground is removed from the test wire SL in the usual manner. The cut-off relay 13 is thereby de-energized and the equipment restored to normal. If the calling party should hang up prior to a line finder LF engaging the calling line and before the cut-off relay 13 operates, the relay 12 remains locked up until the cut-off relay 13 does operate. The succeeding equipment, however, will not maintain the ground on the test wire SL due to the absence of a loop over the calling station line on the release of relay 12. Cut-off relay 13 will, therefore, release and restore the circuit to normal. The non-inductive winding of the relay 13 prevents excessive sparking at the contacts which open the circuit of the operating winding of this relay.

If a call is made from the other party line station B which is provided with a rectifier 3 across the switchhook contacts to which the ringer is connected, the operation is the same as already described excepting that when the relay 12 operates and at its contacts 17 connects the upper talking conductor 1 in parallel with the lower talking conductor 2 to the upper winding of the line relay 11, relay 11 will be reoperated over a circuit extending from positive battery, make contacts 19 of relay 12, contacts 18 of relay 13, upper winding of relay 11, line conductor 2, off-normal dial springs, transmitter and switchhook contacts at station B, rectifier 3 and the ringer coils to ground. A parallel circuit over the switchhook contacts, rectifier 3 and ringer to ground is also completed over conductor 1. When the cut-off relay 13 operates upon the line finder LF engaging the calling line, it closes at contacts 21 a locking circuit for relay 11 over the lower winding of that relay and its contacts 20, prior to opening the circuit of the upper winding at contacts 18. Relay 11 remains operated for the duration of the call and at its transfer contacts 26 switches over from the meter 15 to the meter 14, the booster metering circuit extending over the test wire SL and the rectifier 37. When the called subscriber answers, positive booster battery applied to the wire SL actuates the meter 14 to register the call in the same way as previously described in connection with a call from the station A.

The circuit operation on calls to station A or B will now be described. In the case of two party lines it is customary to provide two sets of terminals on the connectors, the three conductors 31—33 and 34—36 of each set being connected in parallel, but the talking conductors 32 and 33 of one set being reversed. The object of this arrangement is to supply ringing current for party line station A over conductor 1 and for party line station B over conductor 2.

When a call is made to a party line with which a line circuit as described and illustrated is associated, ground received over the test lead 30 from the connector bank energizes a circuit extending over contacts 23 to the cut-off relay 13. The meter 15 is not operated at this time on account of the insertion of the rectifier 37 in series with its winding. Cut-off relay 13, however, operates over the grounded test wire 30, opens at contacts 21 the locking circuit over the lower winding of relay 11, and at contacts 16 and 18, respectively, disconnects ground and the upper winding of the relay 11 from the upper and lower talking conductors 1 and 2 in order to improve the ringing and transmission conditions. The ringer at station A is operated by means of ringing current supplied from the connector in well known manner via conductors 32 and 1, condenser 4, switchhook and ringer at the station A to ground. The ringer at station B is operated in a similar manner but via conductors 35 and 2, condenser 5, rectifier 3, and the ringer at station B to ground. The ringing is tripped and the talking circuit established in the usual manner when the called party replies. When the conversation is terminated both subscribers hang up their receivers causing the equipment to restore to normal.

What is claimed is:

1. In a telephone system, a party line comprising first and second line conductors terminating in an exchange, two stations on said party line, an individual meter at the exchange for each said station, a normally open bridge across said conductors at each station, means for closing a bridge responsive to the party at the respective station initiating a call, a line relay at the exchange having a winding normally connected at one end to said second line conductor and at the other end to one pole of an exchange battery, a normally closed connection from said first line conductor to the opposite pole of an exchange battery, a metering wire, front and back contacts on said line relay over which said metering wire is connected alternatively to one or the other of said meters, a normally open connection including a rectifier at one of said stations and extending from one of said line conductors to ground, means for closing said last mentioned connection when a party at said station initiates a call said rectifier being so poled that at this time no current flows over said last mentioned connection, an auxiliary line relay, contacts on said line relay for closing a circuit for said auxiliary line relay, a locking circuit for said auxiliary line relay, contacts on said auxiliary line relay for reversing the polarity of the current applied to said other end of said line relay winding, a cut-off relay, and a locking circuit for said line relay including make contacts of said cut-off relay.

2. In a telephone system, a party line comprising first and second line conductors terminating in an exchange, two stations on said party line, an individual meter at the exchange for each said station, a normally open bridge across said conductors at each station, means for closing a bridge responsive to the party at the respective station initiating a call, a line relay at the exchange having a winding normally connected at one end to said second line conductor and at the other end to one pole of an exchange battery, a normally closed connection from said first line conductor to the opposite pole of an exchange battery, a metering wire, front and back contacts on said line relay over which said metering wire is connected alternatively to one or the other of said meters, normally open connections including a rectifier at one of said stations and extending from both said line conductors to ground, means for closing said last mentioned connections when the party at said station initiates a call said rectifier being so poled that at this time no current flows over said last mentioned connections, an auxiliary line relay, contacts on said line relay for closing a circuit for said auxiliary line relay, a locking circuit for said auxiliary line relay, contacts on said auxiliary line relay for connecting said one end of the winding of said line relay to said first line conductor and for reversing the polarity of the current applied to said other end of said line relay winding, a cut-off relay and a locking circuit for said line relay including make contacts of said cut-off relay.

3. A telephone system according to claim 1, in which the initial energizing circuit for said line relay includes break contacts of said cut-off relay.

References Cited in the file of this patent

UNITED STATES PATENTS

| | | |
|---|---|---|
| 1,663,747 | Bascom | Mar. 27, 1928 |
| 1,831,385 | Hague | Nov. 10, 1931 |
| 1,864,524 | Bragg | June 28, 1932 |
| 2,001,095 | Deakin | May 14, 1935 |